May 10, 1932.　　　A. D. ROBBINS　　　1,857,978
POWER APPORTIONING MEANS
Filed June 9, 1931
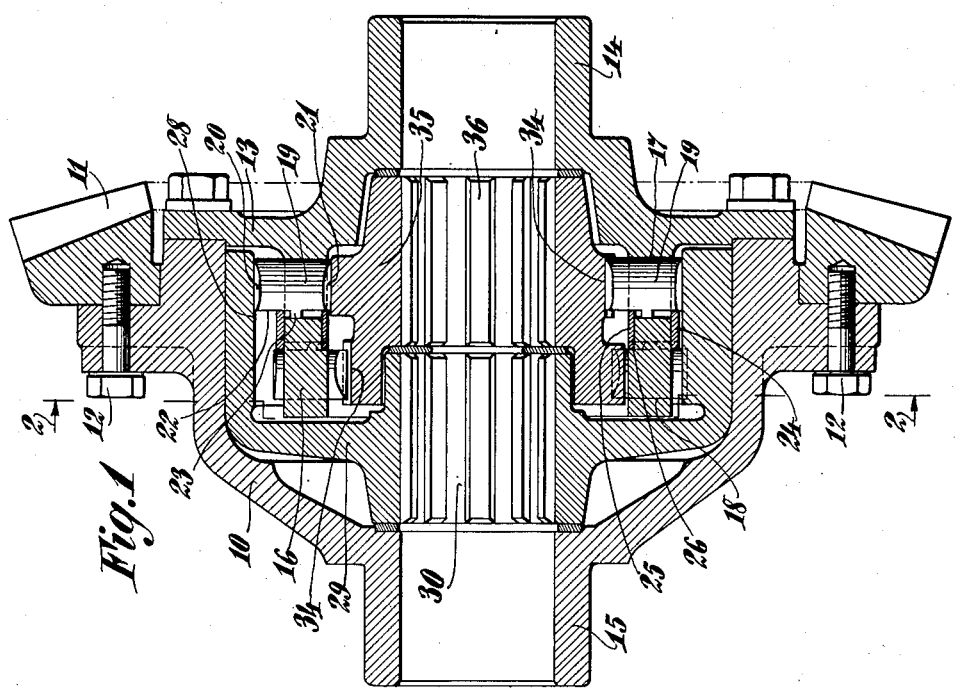
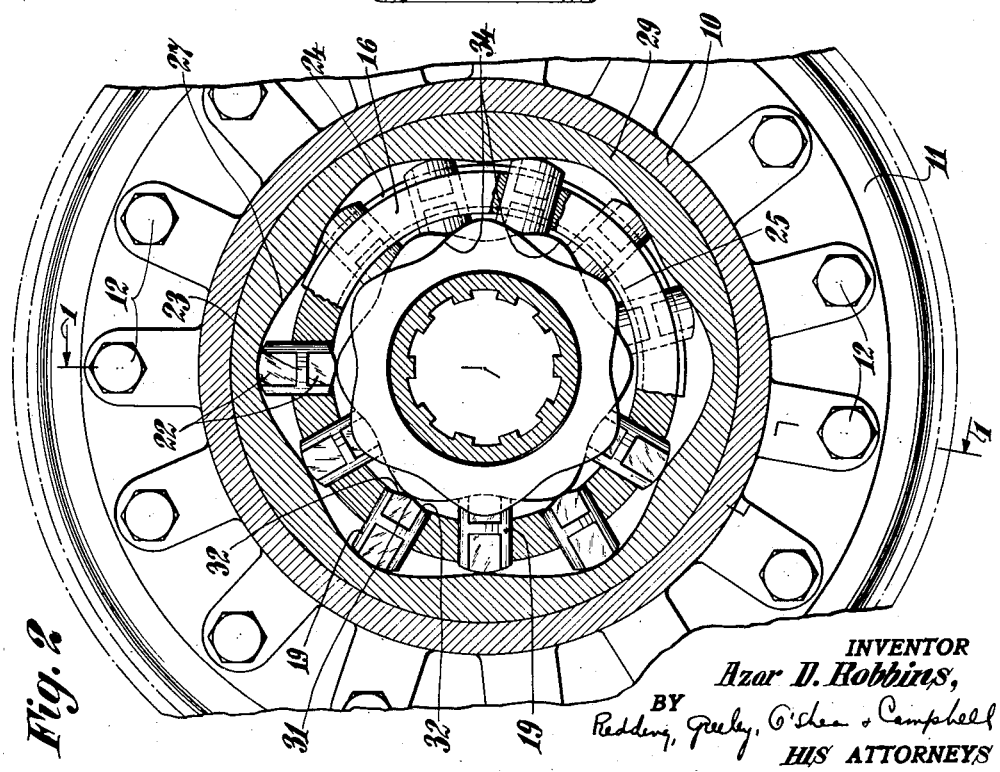
INVENTOR
*Azar D. Robbins,*
BY
Redding, Greeley, O'Shea & Campbell
*HIS ATTORNEYS*

Patented May 10, 1932

1,857,978

UNITED STATES PATENT OFFICE

AZOR D. ROBBINS, OF NEW BRUNSWICK, NEW JERSEY, ASSIGNOR TO INTERNATIONAL MOTOR COMPANY, OF NEW YORK, N. Y., A CORPORATION OF DELAWARE

POWER APPORTIONING MEANS

Application filed June 9, 1931. Serial No. 543,110.

The present invention relates to devices for apportioning power between a plurality of driven members and embodies, more specifically, an improved power apportioning mechanism wherein a plurality of driving wedges, driven by a suitable power source, transmit their power between radially spaced driven cams.

Devices of this general character have been provided heretofore and the present invention comprises an improvement in the specific wedge construction and mounting therefor by means of which the assembly thereof is facilitated and the efficiency of the drive materially improved. The invention has for an object therefore to provide a power apportioning means having a plurality of driving wedges, the driving faces of which are formed to improve the driving efficiency of the mechanism.

A further object of the invention is to provide a device of the above character, wherein the mounting of the driving wedges in position is facilitated and means is provided for preventing the wedges from falling from their supporting ring, as well as turning in the ring about their axes.

Further objects, not specifically enumerated above, will be apparent as the invention is described in greater detail in connection with the accompanying drawings, wherein:

Figure 1 is a view in section, taken on a broken plane indicated by the line 1—1 of Figure 2, and looking in the direction of the arrows.

Figure 2 is a view in section, taken on a plane indicated by line 2—2 of Figure 1, and looking in the direction of the arrows.

Referring to the above drawings, the invention is shown as embodied in a power apportioning means including a housing 10 to which a driving bevel gear 11 is secured by means of bolt 12. The housing has a cooperating closure plate or spider 13 and the plate and housing have aligned cylindrical bearing members 14 and 15, respectively. Within the housing and formed on the plate 13 is a cylindrical ring 16 formed with a plurality (in this instance two) of axially spaced circular rows of apertures 17 and 18. The circular row of apertures 17 is nearest the plate 13 while the row 18 is spaced therefrom, as clearly shown in Figure 1. Within the apertures, driving wedges 19 are slidably mounted, the wedges being similar in construction and formed with outer cam faces 20 and inner cam faces 21.

Upon one side of each wedge, two flat surfaces or lands 22 are formed, being spaced by means of an arcuate rib 23 which conforms to the original profile of the wedges. An outer retaining ring 24 is mounted between the circular rows of wedges and is adapted to be engaged by the ribs 23 to prevent movement of the wedges radially away from the axis of the mechanism beyond a predetermined point. A similarly formed inner retaining ring 25 is preferably countersunk within a recessed portion 26 in the ring 16 and is suitably inserted as by springing in position after the wedges have been inserted.

Outer camming faces 20 of the wedges are curved to conform with the curvature of the sloping portions 27 of the outer camming races 28. These outer cam races are carried upon a driven spider 29 which is splined at 30 to a driven member. In this fashion, the maximum surface contact between the driving wedges and the cams occurs when the maximum amount of power is transmitted therebetween and the serviceability of the mechanism thus highly improved.

The inner cam faces 21 are formed with convex portions 31 and a plurality of concave portions 32 spaced upon opposite sides of the convex portion or face of the surface. The curvature of the concave portions 32 conforms to the sloping surface of the inner cam tracks 34 which are formed upon a driven hub 35 which is splined at 36 to a driven member. The improved surface contact between the inner cam faces of the wedges and the cooperating cam tracks of the driven member thus increases the serviceability of the device as pointed out in connection with the outer cam surfaces and the strength of the resulting structure is thus greatly improved.

It will further be seen that the flattened portions on the wedges will engage the retaining rings and thus the wedges will be prevented from turning in the ring about their axes.

While the invention has been described with specific reference to the accompanying drawings, it is not to be limited, save as defined in the appended claims.

I claim as my invention:

1. A power apportioning device comprising opposed driven members and a driving member therebetween, driving wedges carried by the driving member to engage the driven members, inner and outer retaining bands on the driving member, and ribs on the wedges to engage the bands.

2. A power apportioning device comprising opposed driven members and a driving member therebetween, driving wedges carried by the driving member to engage the driven members, inner and outer retaining bands on the driving member, and ribs on the wedges formed by cut-away portions thereon, whereby axial movement of the wedges is permitted between the bands.

3. A power apportioning device comprising opposed driven members and a driving member therebetween, driving wedges carried by the driven members, convex cam surfaces on the outer faces of the wedges conforming in curvature to a portion of the surface of the outer driven member, and concave and convex portions in the inner faces of the wedges.

4. A power apportioning device comprising opposed driven members and a driving member therebetween, driving wedges carried by the driving member to engage the driven members, convex cam surfaces on the outer faces of the wedges conforming in curvature to a portion of the surface of the outer driven member, and concave and convex portions on the inner faces of the wedges, said last named portions conforming in curvature to a portion of the surface of the inner driven member.

5. As an article of manufacture, a wedge having a non-circular cross section and having inner and outer cam faces upon its ends, the outer cam face being convex and the inner cam face having concave and convex portions.

This specification signed this 26th day of May, A. D. 1931.

AZOR D. ROBBINS.